(12) United States Patent
Luzzi

(10) Patent No.: US 7,805,837 B2
(45) Date of Patent: Oct. 5, 2010

(54) METHOD OF INSTALLING AN ELECTRICAL INSULATING DEVICE

(75) Inventor: Glenn J. Luzzi, Mt. Bethel, PA (US)

(73) Assignee: Richard's Manufacturing Company

( * ) Notice: Subject to any disclaimer, the term of this patent is extended or adjusted under 35 U.S.C. 154(b) by 110 days.

(21) Appl. No.: 11/811,893

(22) Filed: Jun. 11, 2007

(65) Prior Publication Data

US 2008/0072424 A1    Mar. 27, 2008

Related U.S. Application Data

(63) Continuation of application No. 10/926,774, filed on Aug. 26, 2004, now Pat. No. 7,228,626, which is a continuation of application No. 10/002,578, filed on Oct. 26, 2001, now Pat. No. 6,782,618.

(51) Int. Cl.
*H01R 43/00* (2006.01)

(52) U.S. Cl. .............................. 29/857; 29/825; 29/868; 285/382.2

(58) Field of Classification Search .................... 29/857, 29/745, 748, 825, 868; 285/382.2, 915
See application file for complete search history.

(56) References Cited

U.S. PATENT DOCUMENTS 5,467,515 A * 11/1995 Luzzi .......................... 29/235
2003/0079902 A1* 5/2003 Luzzi ....................... 174/88 R

* cited by examiner

*Primary Examiner*—Thiem Phan
(74) *Attorney, Agent, or Firm*—Bakos & Kritzer

(57) ABSTRACT

A method of installing a mandrel, useful in high voltage cable splicing and termination operations, wherein said mandrel exhibits a tapered surface and longitudinal ribs for assembly onto a high-voltage cable to be connected to a premolded or extruded high-voltage component. As the premolded high-voltage component is passed over the mandrel, the mandrel expands the internal cavity of the high- voltage component and may further reduce the loss of lubrication within the internal cavity of the high-voltage component thereby allowing for the high voltage component to be easily installed onto the high-voltage cable. After the high voltage component passes over the apparatus, the high-voltage component may return to a lesser-expanded shape providing a snug fit around the cable member. The high-voltage component may then compress around the cable, with a uniform layer of lubricant remaining in between interior cavity of the high-voltage component and the outer layer of the cable.

3 Claims, 10 Drawing Sheets

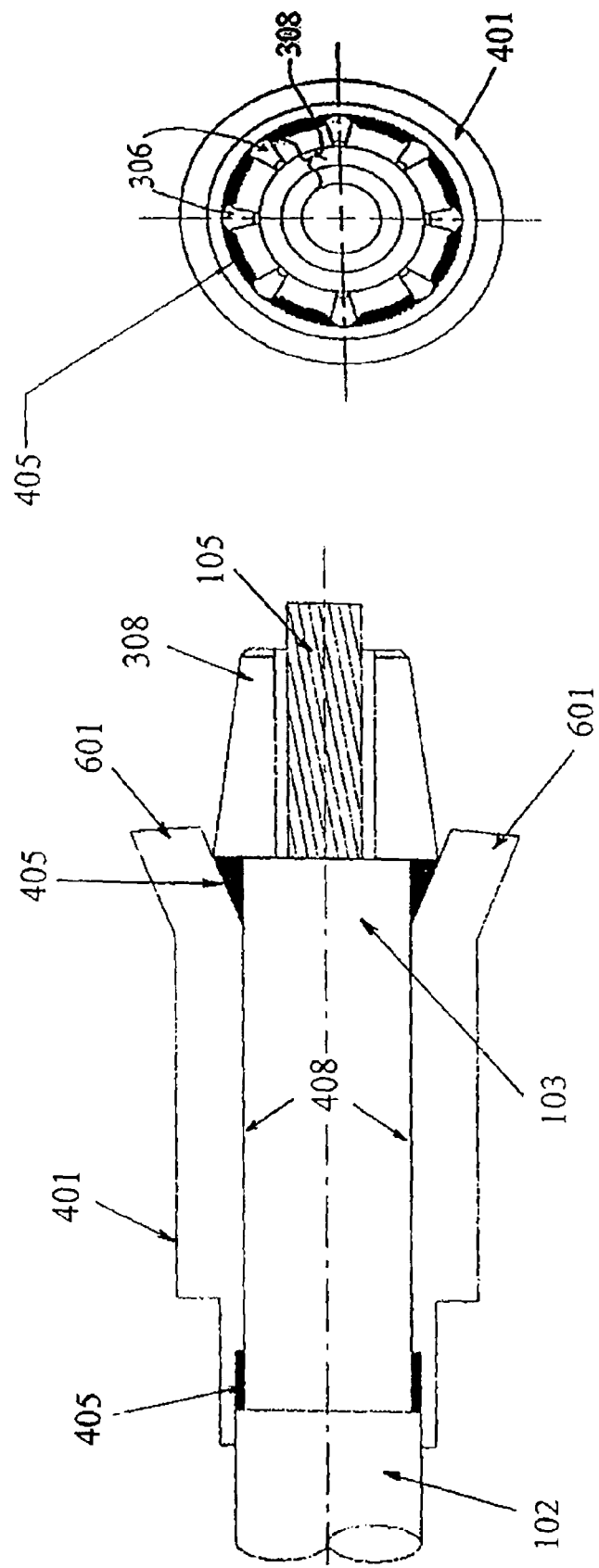

METHOD OF INSTALLING AN ELECTRICAL INSULATING DEVICE

CROSS REFERENCE TO RELATED DOCUMENTS

The present application is a Continuation of application Ser. No. 10/926,774 filed on Aug. 26, 2004, now U.S. Pat. No. 7,228,626; which is a Continuation of application Ser No. 10/002,578, filed on Oct. 26, 2001, now U.S. Pat. No. 6,782,618.

FIELD OF THE INVENTION

The present invention relates to the field of cable splicing in high-voltage environments and in particular to the placement of a premolded high-voltage connector or other removable or permanent electrical insulating device over a high-voltage cable.

BACKGROUND OF THE INVENTION

The need for splicing high-voltage power cable is often encountered in the power service industry. For example, splicing may be required either due to damage to an existing cable caused by digging during construction or other like activities. In addition, the need for high-voltage cable splicing may arise due to additional cable connection requirements as a result of residential expansion and increasing energy demands. Unlike the splicing of low-voltage devices, which may be accomplished with the use of simple connectors with minimal insulation, (frequently constructed of copper, aluminum and like components) high-voltage devices require splices which must maintain proper voltage grading, electrical insulation and water tightness. To achieve these requirements, the art of premolded high-voltage splicing may include the use of one, two, three or more insulated members. In addition, a tight fitting rubber member or sleeve may also cover the cable member connections. Due to the fact that the sleeve is generally manufactured of one diameter, cable adapters may be employed to accommodate a broad range of cable diameters. Therefore, in combination, the insulated members, sleeves and cable adapters secure the spliced region, thereby providing for protection against water seepage into the connection. In addition, this type of assembly allows the cable-to-cable splice to achieve the desired voltage and insulation demands. Such a fitting requires a careful, and often timely installation process, which involves the connection of opposing cable members to, and/or the placement of cable adapters over the cable insulation. Cable adapters or cable members are then connected to one another, or to other connector components, to provide a successful splice. It is further known in the art to require additional components to be installed on-site for securing opposing cable adapters or cable members to one another. As a result, as the number of additional installation components increase, more assembly time may be required in the field, thereby effecting the efficiency of the splicing operation.

For a successful splice, the cable members must fit securely within the corresponding splice components. Thus the inside diameter of the splice component is generally designed to be smaller than the outer diameter of each corresponding cable member (i.e., commonly referred to as the "interference fit".) To insure a snug fit, lubricant must be applied along the outside of the cable members and/or the inside of the cable adapters to assist in the installation process as the cable adapters are pulled over the corresponding cable members. However, difficulty may arise when a prepared or chamfered cable is inserted within a lubricated cable adapter. Specifically, upon insertion of the cable within the lubricated cable adapter, the chamfered cable acts to collect the useful lubrication from the inner portions of the cable adapter. Also, the interference fit acts to collect the lubrication from the outer portions of the cable thereby reducing the effectiveness of the lubrication. By removing the desired lubrication, it becomes extremely difficult to properly assemble the spliced cable member. In order to assist in the cable splicing operation it has become known in the art to use a wedge-shaped device to assist in drawing the chamfered cable through the cable adapter. Specifically, an adapter wedge, or mandrel, may be used to stretch the internal portions of the cable adapter to assist in drawing the chamfered cable through the cable adapter. By providing a wedge shaped device to assist in the assembly of the spliced members, lubricant may also be dispersed along the inner length of the spliced area (i.e., lubricant may be placed on the cable insulation, within the inner diameter of the cable adapter and on the wedge), thereby providing a void-free interface between the interior surfaces of the assembly. In addition, the void-free interface may further provide a resilient barrier against the ingress of moisture into the spliced region. However, adapter wedges or mandrels known in the art also remove and limit the usefulness of lubrication by creating excessive deposits of the lubrication at the base of the wedge as the splice is assembled. Specifically, the present wedges utilized in the art do not provide an adequate means for prevention of the removal of the lubricant during assembly. For example, based on the mechanical configuration and the designs of the prior art adapter wedges (i.e., linearly-tapered hollowed cylindrical cone), most, if not all of the lubricating substance is often removed from the cable members and cable adapters upon the placement of the wedge. At the circumference of the conical base, deposits of the lubricating substance form thereby rendering the lubricating substance useless by failing to provide a lubricating source at the points of contact between the adapter wedge and the cable adapter. Therefore, it becomes extremely difficult for lineman to complete the splice. The improper lubrication may lead to the use of excessive force by a lineman when affixing the adapter over the cable, which may lead to improper installation. As a result of this timely and difficult splicing process, additional and unnecessary labor costs may be incurred in the field.

Numerous disclosures are known in the art that attempt to deal with the splicing inconveniences encountered. Many of these disclosures and modes of splicing may be compatible with the present invention; however, these disclosures fail to provide the effective splicing components as presented in the present disclosure. Specifically, it is contemplated that any premolded splicing connection comprising an interference fit may be compatible with the present disclosure. For example, Fallot U.S. Pat. No. 3,980,374 teaches of a separable splice connector for use with 15 to 25 kilovolts and 600 amperes of current. The connector employs a unitary splice body assembly. The splice body assembly is constructed of molded elastic material and may be utilized for providing a straight splice. Therefore, it is foreseeable that the use of the adapter wedge employed in the present invention may be utilized in conjunction with the apparatus set forth in Fallot. However, Fallot fails to disclose the use of an adapter wedge for inserting the cable members within the corresponding cable adapters providing a secure fit. Therefore, there exists a need for an apparatus and method which provides a secure splice allowing for ease in operation, by allowing for a natural secure fit between cable members and splice components.

A second apparatus, comprising a pre-molded high voltage splice that may be compatible with the present invention, is disclosed in Lien U.S. Pat. No. 5,041,027. Lien discloses a system for electrically connecting a first power cable end to a second power cable end. The splice system comprises a first probe adapted to be electrically connected to the first power cable end and a second probe adapted to be electrically connected to the second power cable end and a cable splice. The cable splice further comprises two ends wherein a first female contact assembly is adapted to engage with the first probe and a second female contact assembly is adapted to engage with the second probe thereby forming a splice. However, Lien fails to disclose an apparatus comprising a mechanical configuration, which is effective for assisting in splicing high-voltage cables, that controls the removal of a lubricating substance. In addition, Lien fails to disclose an apparatus that allows for a dielectric sealant to be dispersed along the inner length of a cable adapter thereby providing a void-free bond between the surfaces of the cable member and cable adapter thereby providing ease in assembly. Furthermore, Lien fails to disclose a simplified method for providing an effective cable splice.

Luzzi U.S. Pat. No. 5,570,497 teaches of an apparatus and method for providing a linearly tapered mandrel for use with the insertion of a cable member through a premolded expandable product. The premolded expandable product has an initial inner radius approximately equal to the outer radius of the cable member. Upon forcing the linearly tapered mandrel inside the premolded expandable product the product stretches and a clamp maintains the product's stretched position. The unit can then be used onsite for immediate installation whereby a cable can then be inserted into the stretched premolded expandable product. Subsequently, upon releasing the clamp, the product returns to its original position for a snug fit around the inserted cable. However, Luzzi fails to disclose a simplified method and apparatus for drawing a prepared cable through a cable adapter that does not require the use of additional onsite tools. In addition, Luzzi fails to disclose a method for controlling the removal of lubricant within a splice apparatus.

Numerous other systems and splicing mechanisms are known and utilized in the art. However, none of the currently employed systems provide for ease of application in creating an effective splice. For example, numerous systems are known that expand the inner diameter of the cable adapter or other cable splicing connectors by employing the use of complex tools onsite. These systems, demanding complex tool requirements, have proven to be costly for on-site applications. In addition, these systems, often employing some type of dielectric compound or lubricating substance tend to remove the lubricating substance when a cable is affixed within an apparatus. This type of inefficient design tends to make the performance of this type of splicing unduly time-consuming resulting in increased labor time and cost.

In other known systems, a stretching device may be employed for expanding the interior circumference of an adapter device. In these types of systems, upon placing a lubricated cable member within a premolded expandable product, the lubrication is completely removed from the outside of the cable member and the inner portion of the product if the product is not adequately stretched and held in place. Additionally, if the premolded expandable product is kept stretched for a long period of time it may incur damage and possibly take a permanent set, making it prone to faults and defects in construction.

In other known systems in the art a user may place lubrication on the cable members and lubricate a linearly tapered mandrel prior to the insertion of the cable into the premolded expandable product. However, the designs of mandrels in the art cause the lubrication to collect in the front end and back end of the cable adapter thereby removing the lubrication from the inside of the premolded expandable product as the mandrel is guided through the product. As a result of this loss of lubrication, installation becomes extremely difficult and in some cases impossible. Therefore, there exists a need in the art for an invention to provide a means for the uniform application of lubrication throughout an entire inner portion of a premolded expandable product. Furthermore, it is desirable to provide a simplified apparatus for high voltage splicing, requiring minimal additional tools, which allows a cable adapter to be placed over a cable member, requiring limited force for assembly. In addition, it is desirable to provide an apparatus that eliminates excessive assembly time onsite, limits the stress on the cable components and minimizes the risk of injury of a lineman during assembly by utilizing the applied lubricant instead of removing the lubricant as the cable adapter is fixed over a cable member.

Thus, their exists a need for an invention which resolves the limitations of the prior art by providing a suitable means for drawing a cable adapter over a cable splicing apparatus which does not eliminate the usefulness of the lubrication product between the inner surface of a premolded cable apparatus and the outer surface of a cable member.

SUMMARY OF THE INVENTION

The present invention provides a method and apparatus for preparing an effective cable splice providing uniform distribution of lubrication between cable members and joint components in high-voltage cable splices.

The present invention comprises a novel, uniquely tapered adapter wedge, or mandrel, further comprising longitudinally placed ribs. In the preferred embodiment of the present invention, the mandrel includes a cylindrical extended end with a radius approximately equal to the inner radius of a premolded expandable product in its relaxed state. In addition, the mandrel is tapered generally throughout its length as its radius gradually increases. Ribs protrude sufficiently outward from the mandrel's center, dispersed longitudinally around the circumference of the outside of the mandrel.

To begin the cable splice, the mandrel, coated with a lubricant (i.e., non-hydrocarbon based lubricants or hydrocarbon based lubricants depending on the material properties of the splice components), is inserted over one end of a cable. The lubricated cable adapter may be lubricated by any known substances common in the art, in addition to those substances not yet contemplated. For example, it is known in the art that silicone grease compounds may prove useful in this type of application when hydrocarbon based materials are utilized. The cable adapter may then be drawn over the mandrel. As it enters, the mandrel stretches the inside of the cable adapter and the lubrication is transferred from the mandrel to the inner lining of the cable adapter. As the mandrel passes within the cable adapter, the longitudinally placed ribs on the outside of the mandrel serve to prevent the mandrel from wiping away and collecting the lubricant thereby maintaining a significant portion of lubrication within the regions displaced between the ribs. Although the preferred embodiment provides one design that is useful for maintaining the lubrication, it is foreseeable that numerous designs of the adapter wedge may be developed which may employ a broad range of characteristics useful for maintaining the desired lubrication within the joint. For example, it is foreseeable that designs may include any of a series of numbers of ribs, ribs of varying dimensions and shapes, raised ribs, recessed ribs, recessed dimples, convex protrusions, concave depressions or other similar designs. Upon the mandrel's exit from the opposite end of the cable adapter, the cable remains positioned inside the lubricated cable adapter forming a tight fit between the cable and cable adapter. The tight fit around the cable member provides a barrier thereby thwarting the ingress of moisture. The cable adapter may then be slid back and forth over the cable member to allow for easy positioning adjustments during splicing.

Therefore, it is an object of the present invention to provide an effective system for high-voltage cable splicing and high-voltage cable termination.

It is a further object of the present invention to provide a means for maintaining a layer of lubrication on the inside of a cable adapter or other premolded expandable product.

In addition, it is an object of the present invention to provide a means for preventing the removal of lubrication within a cable adapter while the cable adapter is stretched during a splicing operation.

It is still a further object of the present invention to provide a means for maintaining a layer of silicone lubricant between the outside of a cable member and the inside of a cable adapter or other premolded expandable product while the adapter is guided along the surface of the cable member.

In addition, it is an object of the present invention to provide a means for maintaining a layer of silicone lubricant between the outside of a cable member and the inside of a cable adapter allowing for fine adjustment of the splice apparatus.

It is also an object of the present invention to provide a means for maintaining a layer of silicone lubricant between the outside of a cable and the inside of a cable adapter or other premolded expandable product wherein the premolded expandable product is not stretched for a long period of time and does not require clamps or other like specialized tools.

It is, therefore, an object of the present invention to provide a uniquely tapered mandrel with longitudinally positioned ribs to provide a means of maintaining a distribution of silicone lubricant between the outside of a cable and the inside of a cable adapter or other premolded expandable product.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which:

FIG. 6 depicts a side view of a mandrel assembly sequence of the present invention at an intermediate point of insertion as the adapter wedge or mandrel is set within the assembly at a point of egress;

FIG. 6A depicts a front view of a mandrel assembly sequence of the present invention at an intermediate point of insertion as the adapter wedge or mandrel is set within the assembly at a point of egress;

DETAILED DESCRIPTION OF THE INVENTION

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention. The following presents a detailed description of a preferred embodiment (as well as some alternative embodiments) of the present invention.

Figure 1:
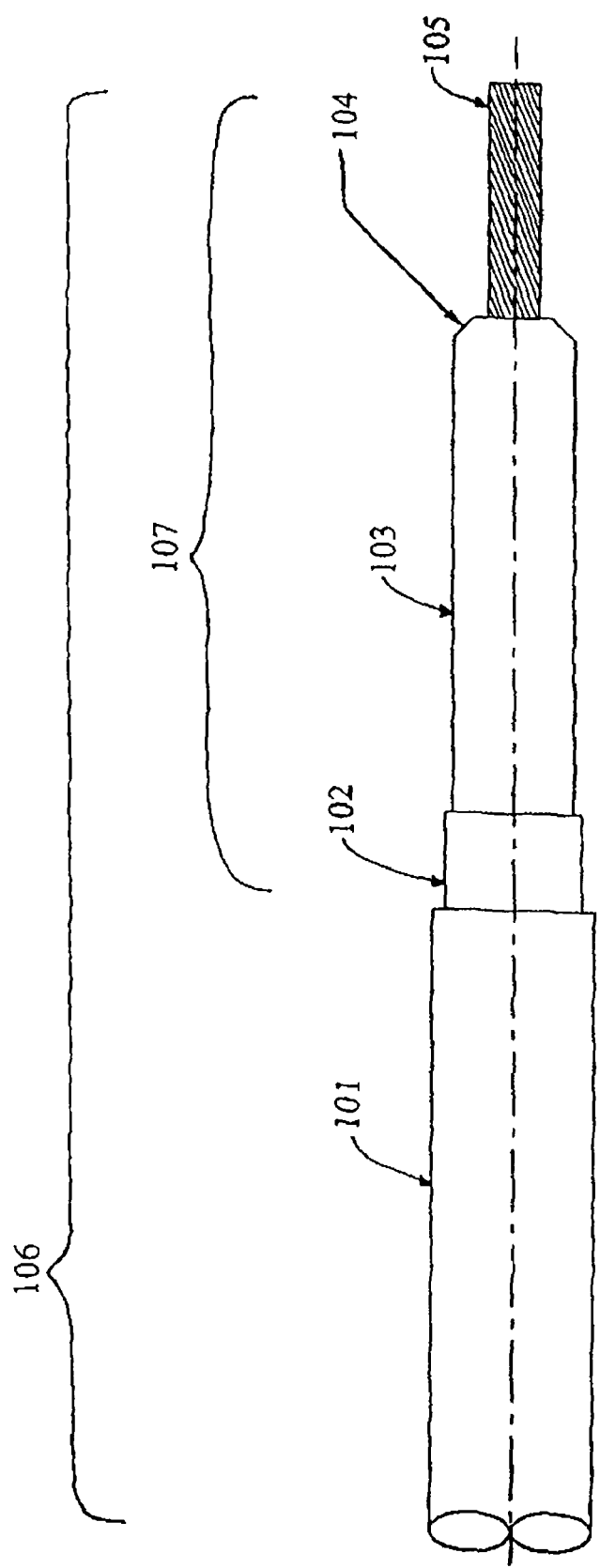
FIG. 1 depicts a typical assembly cable preparation.

Referring first to FIG. 1, shown is a typical assembly cable preparation 106 comprising outer cable jacket 101 and termination preparation 107. Insulation 103 is stripped back from cable end 105 of termination preparation 107. Insulation shield 102 is also pulled back away from cable end 105. Outer cable jacket 101 is stripped back beyond insulation shield 102. In addition, insulation 103 is chamfered 104 to reduce assembly forces resulting from the insertion of a premolded device over cable preparation 106 into a premolded expandable product.

Figure 2A:
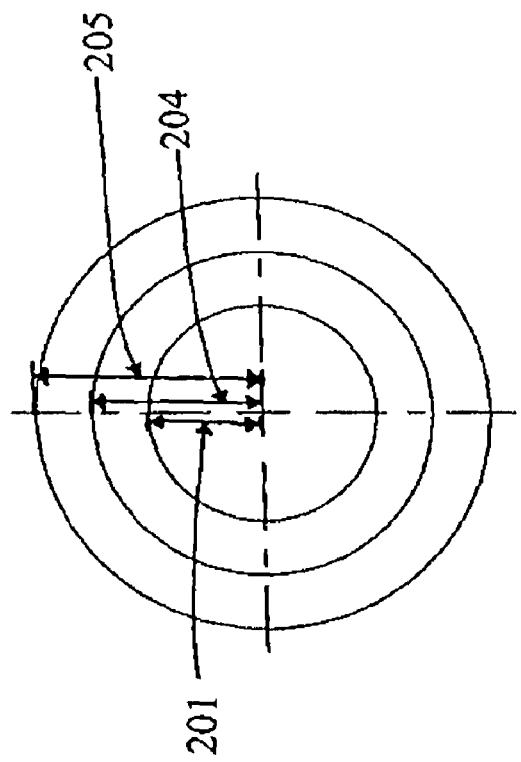
FIG. 2A depicts a front view of a linearly tapered mandrel known in the art.
Figure 2:
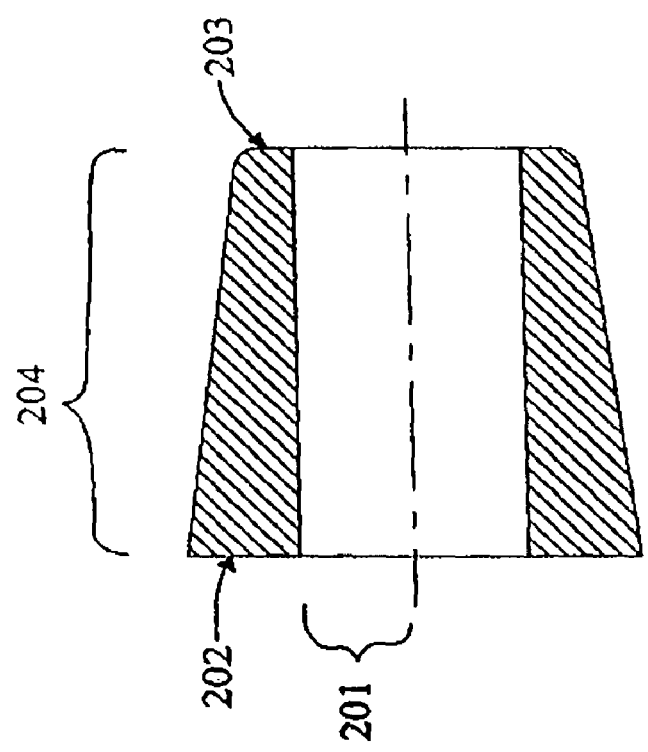
FIG. 2 depicts a side view of a linearly tapered mandrel known in the art.

Referring next to FIG. 2, shown is a prior art linearly tapered mandrel 204 with front taper 203 with a shorter radius than the radius of the back taper 202. Inner radius 201 is such that mandrel 204 may be inserted onto a prepared cable (as depicted in FIG. 1). FIG. 2A depicts a front view of linearly tapered mandrel 204 with inner radius 201, and with front and back taper, comprising radius 204 and radius 205, respectively.

Figure 3A:
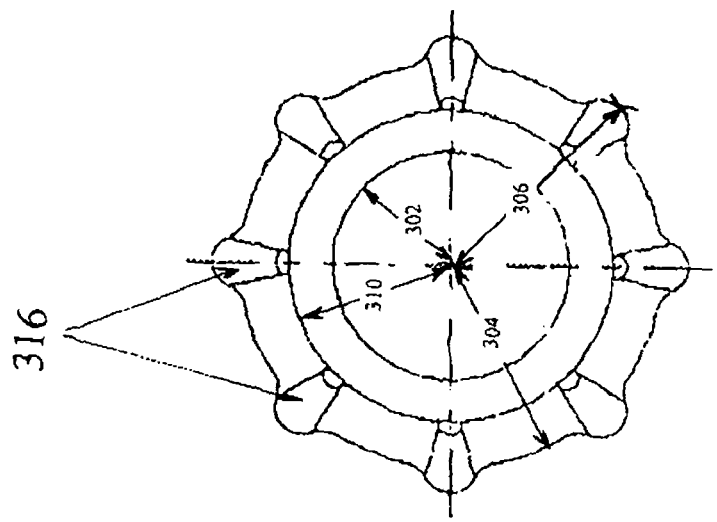
FIG. 3A depicts a front view of an embodiment of the present invention comprising a uniquely tapered mandrel and longitudinally positions ribs.
Figure 3:
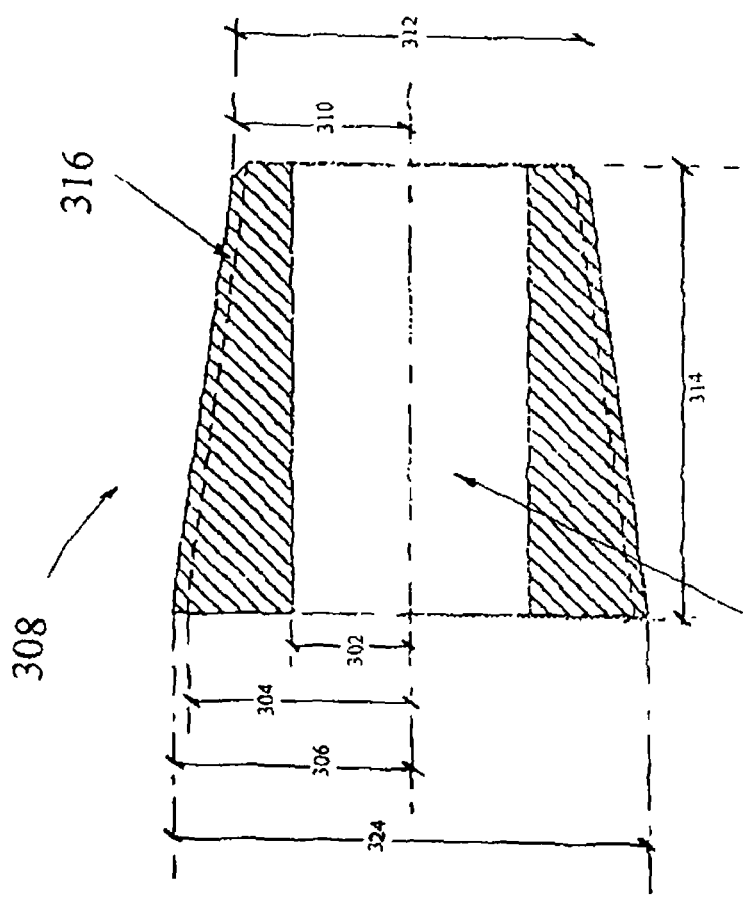
FIG. 3 depicts a side view of an embodiment of the present invention comprising a uniquely tapered mandrel and longitudinally positioned ribs.

FIG. 3 depicts the preferred embodiment of the present invention comprising a uniquely tapered mandrel 308. The uniquely tapered mandrel 308 comprises a bore 320 (it is preferred that bore 320 may not be tapered due to modern molding efficiencies; however, it is contemplated by the present invention that the bore 320 may also be tapered) and a tapered shell, wherein said tapered shell comprises a first dimension at a first end 312 (radius 310) and a second dimension at a second end 308 (radius 306). The second dimension 324 may be at least slightly larger than the first dimension 312. Taper 305 further comprises a plurality of integral ribs 316, which are distributed longitudinally along the length of the uniquely tapered mandrel 308 perpendicular to the circumference of the mandrel 308. The thickness of ribs 316 is defined by the difference in radii 306 and 304. Although numerous thickness values may be utilized in the present invention depending on the degree of lubrication desired, the degree of stretch desired to fit the splice component and the force necessary to install the component, it has been determined that ribs with a thickness of 0.06 inches to 0.25 inches, beyond the substantial exterior portion of the mandrel, are most appropriate for use in the field of high voltage splicing. However, values greater than and less than the preferred thickness values may be utilized in the art depending on the types of materials used and the preferred lubricants employed. In addition, mandrel 308 may be manufactured of any material strong enough to support the inward hoop force imposed on it from a fully, expanded cable adapter. However, in the present embodiment of the invention, it is preferred that the mandrel 308 be manufactured of a polypropylene-type material, polyethylene-type material, polyvinyl chloride-type material, polyurethane type-material, epoxy-type material, or a nylon-type material; however, numerous other types of materials may be utilized in the present invention. It is foreseeable in the present invention, that mandrel 308 can be fabricated by machining or more preferably by molding. Furthermore, it is known in the art that present high-voltage components are primarily manufactured of two distinct materials, ethylene propylene diene monomers (EPDM) or silicones. Since EPDM's are hydrocarbon-based materials, it is preferred in the present invention that the lubricant utilized should comprise non-hydrocarbon (petroleum) based lubricants. Typically such lubricants are silicone-based materials such as dimethypolysiloxane. Furthermore, it is preferred in the present invention that for splicing materials manufactured of silicone-based components, lubricant may comprise any non-silicone based materials except those materials that would be deleterious to high-voltage cable systems.

In the present embodiment, radius 302 should be constructed of sufficient size so that the prepared cable (as set forth in FIG. 1) can easily be inserted within the mandrel 308 to be subsumed within the interior volume 320 of mandrel 308. For example, a mandrel may be manufactured for connectors of a 600 Ampere classification wherein the diameters of the cable adapters in which mandrel 308 is to be inserted cover high-voltage diameter ranges of 0.500 to 2.120 inches. The most common diameters used for this type of connection are in a range of 0.980 to 1.780 inches. In another example, the present invention may be manufactured for a 200 Ampere classification premolded separable connectors, wherein diameters may range from 0.500 to 1.465 inches with a typical range of 0.640 to 0.950 inches. It is foreseeable that the present invention may be manufactured for other connectors of varying classifications, including, but not limited to 200 Ampere classification connectors, 600 Ampere classification connectors, 900 Ampere classification connectors or the like.

FIG. 3A depicts a front view of the uniquely tapered mandrel 308 of the present invention. Inner radius 302 of interior volume of the mandrel is shown for reference. Furthermore, ribs 306 are identified and positioned longitudinally along mandrel 308. Additionally, the thickness of ribs 306 is defined by the differences in radius 306 and radius 304.

Figure 4A:
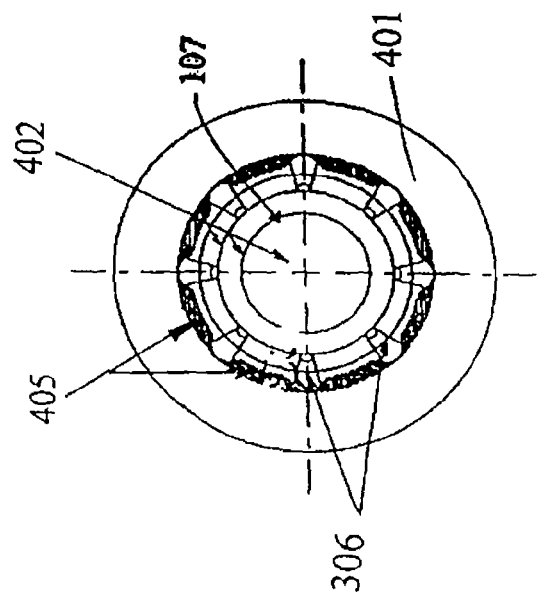
FIG. 4A depicts a front view of a mandrel assembly sequence of the present invention at the initial point of insertion.
Figure 4:
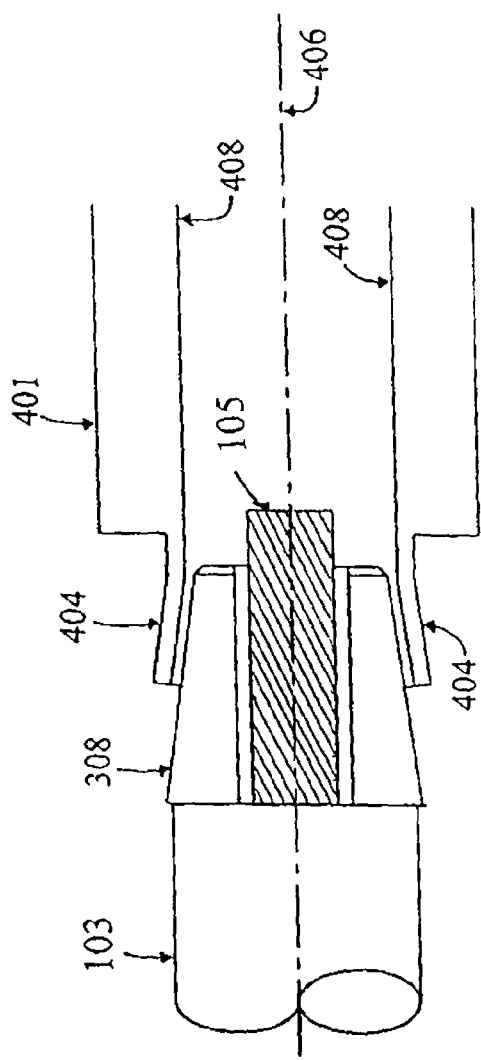
FIG. 4 depicts a side view of a mandrel assembly sequence of the present invention at the initial point of insertion.
Figure 5A:
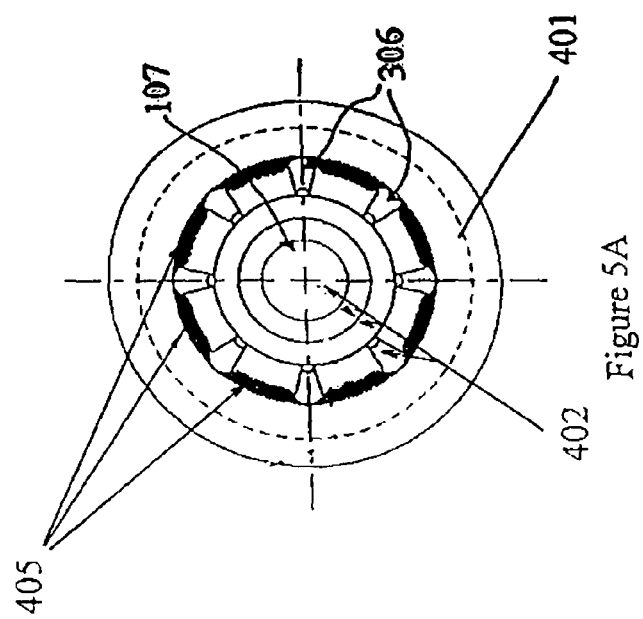
FIG. 5A depicts a front view of a mandrel assembly sequence of the present invention at an intermediate point of insertion as the adapter wedge or mandrel is set within the assembly.
Figure 5:
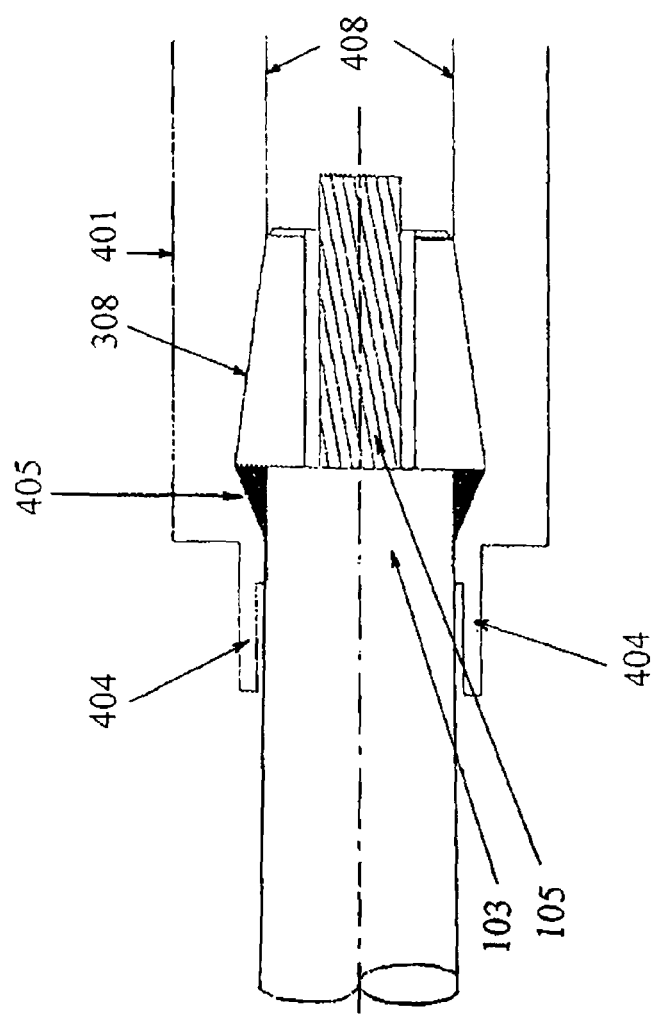
FIG. 5 depicts a side view of a mandrel assembly sequence of the present invention at an intermediate point of insertion as the adapter wedge or mandrel is set within the cable adapter.
Figure 7A:
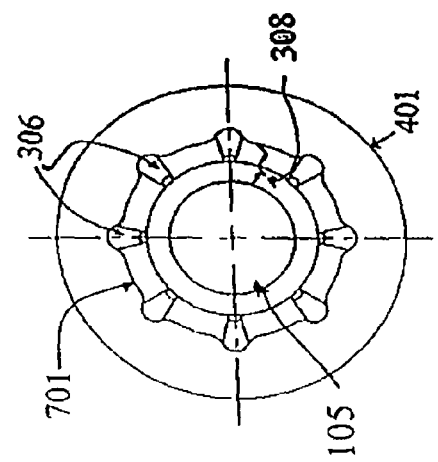
FIG. 7A depicts a front view of a mandrel assembly sequence of the present invention after the adapter wedge or mandrel has been completely set within the cable adapter thereby creating a form-fitting assembly.
Figure 7:
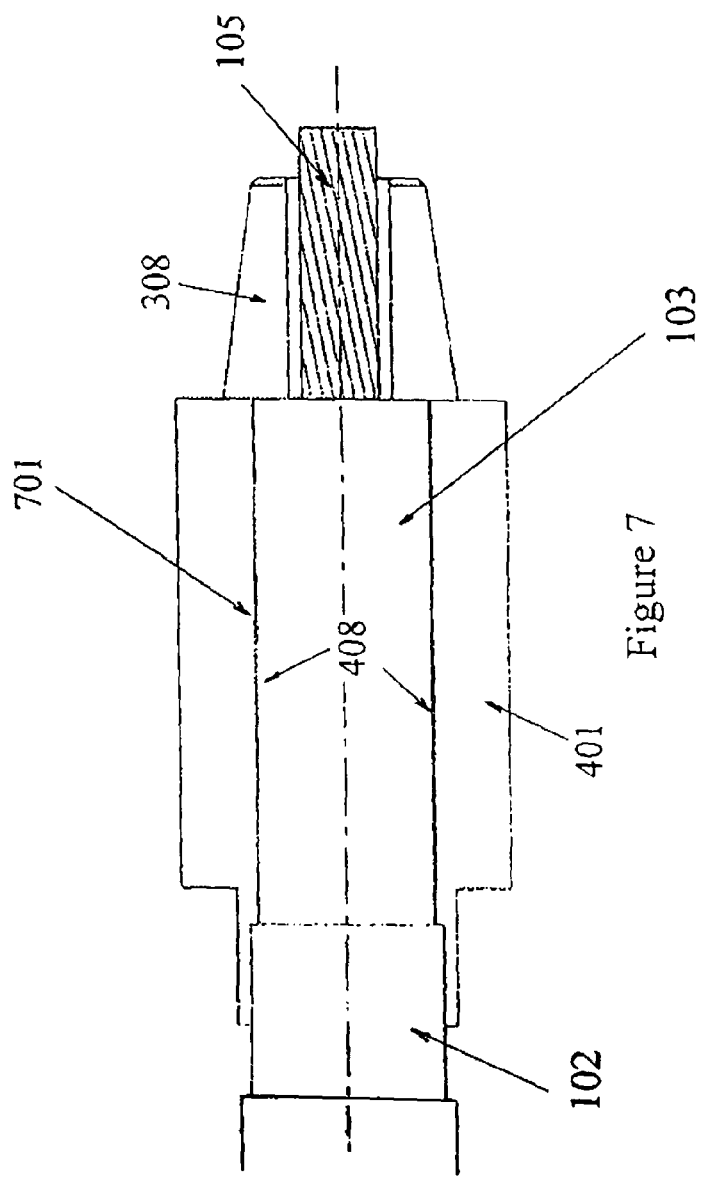
FIG. 7 depicts a side view of a mandrel assembly sequence of the present invention after the adapter wedge or mandrel has been completely set within the cable adapter thereby creating a form-fitting assembly.

The functionality of mandrel 308 can be observed in the mandrel assembly sequences of FIG. 4 and corresponding FIG. 4A, FIG. 5 and corresponding FIG. 5A, FIG. 6 and corresponding FIG. 6A and FIG. 7 and corresponding FIG. 7A. Depicted is the splicing sequence employing the mandrel as disclosed in the present invention at various positions throughout the application wherein the mandrel acts to expand the cable adapter as the cable adapter is placed over the wedge and prepared cable.

Beginning with FIG. 4, mandrel 308 is shown placed onto the typical cable preparation including insulation 103, and more specifically on the cable end 105 of the termination preparation. Lubricant 405 is applied to mandrel 308, the prepared cable surface and the inside of the cable adapter 401 or joint along the interface between the cable adapter 401 and the mandrel 308. The cable adapter 401 is then pulled over the mandrel 308 and the cable preparation. As the cable adapter 401 is pushed along the mandrel, the cable adapter stress cone 404 is stretched and expanded outwards from the cable adapter's geometrical center 406 allowing for ingress of the mandrel 308 and the cable preparation confined within the inner wall 408 of cable adapter 401.

Turning next to corresponding FIG. 4A, depicted is a frontal view of the embodiment set forth in FIG. 4. Displayed is the view looking into the opposite end of cable adapter 401 as mandrel assembly 402 (comprising mandrel and terminal preparation 107), including ribs 306, is placed within the end of cable adapter 401 thereby expanding the cable adapter stress cone. At this stage of the embodiment, lubricant 405 remains on the inner surface of the cable adapter.

Referring next to FIG. 5, inner wall 408 of cable adapter 401 is expanded as it progress along the mandrel assembly (i.e. mandrel 308, cable end 105, insulation 103 and insulation shield (not shown)). Cable adapter stress cone 404 returns to a relaxed position around the insulation 103 and insulation shield (not shown) (which may or may not have been removed) of the prepared cable as the cable adapter is pulled over the cable. As the operation proceeds, lubricant 405 remains along cable adapter inner walls 408 behind mandrel 308 to allow for easier positioning of the cable.

FIG. 5A depicts a front view of the mandrel assembly sequence of FIG. 5 wherein lubricant 405 is shown assisting the expansion and penetration of the cable adapter 401 along the mandrel assembly 402 (i.e., mandrel, terminal preparation 107 and cable preparation). In addition, depicted is the presence of lubrication 405 between integral ribs 306 of the mandrel within the voids between the mandrel 308 and the cable adapter 401.

FIG. 6 depicts the further transgression of cable adapter 401 along the mandrel 308 and the cable preparation (i.e., cable end 105, insulation 103, insulation 102 and outer cable jacket 101 (not shown)). A portion of lubricant 405 remains along cable adapter inner walls 408 behind mandrel 308 thereby providing lubrication throughout the length of the cable adapter 401. Cable adapter edges 601 expand as mandrel 308 nears the cable adapter opening.

FIG. 6A depicts a front view of the sequence shown in FIG. 6, wherein lubricant 405 remains between the integral ribs 306 of the mandrel as cable adapter is pulled up and over the mandrel 308. In addition, depicted is the presence of lubrication 405 between integral ribs 306 of the mandrel within the voids between the mandrel 308 and the cable adapter 401.

Referring next to FIG. 7, depicted is the next point in sequence wherein cable adapter is fully installed onto cable preparation securing insulation shield 102 and cable insulation. At this point of operation, mandrel 308 may remain on cable end 105 for further installation or may be removed. A film or layer 701 of lubricant remains between the insulation of the cable member and the cable adapter inner walls 408 to allow for easy final positioning of the cable adapter 401. Cable adapter 401 is returned to a partially relaxed position or slightly expanded interference form-fitting position to provide for water tightness securing the cable member. The film of lubricant 701 permits the cable adapter 401 to slide horizontally in either direction for fine position adjustments. Furthermore, lubricating film provides for the protection of the assembly by thwarting the ingress of the moisture within the assembly. At this point of assembly, mandrel 308 may be removed from termination preparation 107, if so desired, and termination preparation 107 may be connected to electrical connection means to complete the cable splice.

FIG. 7A depicts a front view of mandrel 308 positioned at an external point beyond the end of cable end 105 of cable preparation. The cable is securely fitted within the cable adapter and cable end 105 remains within the mandrel 308, but external to the cable adapter.

Figure 8:
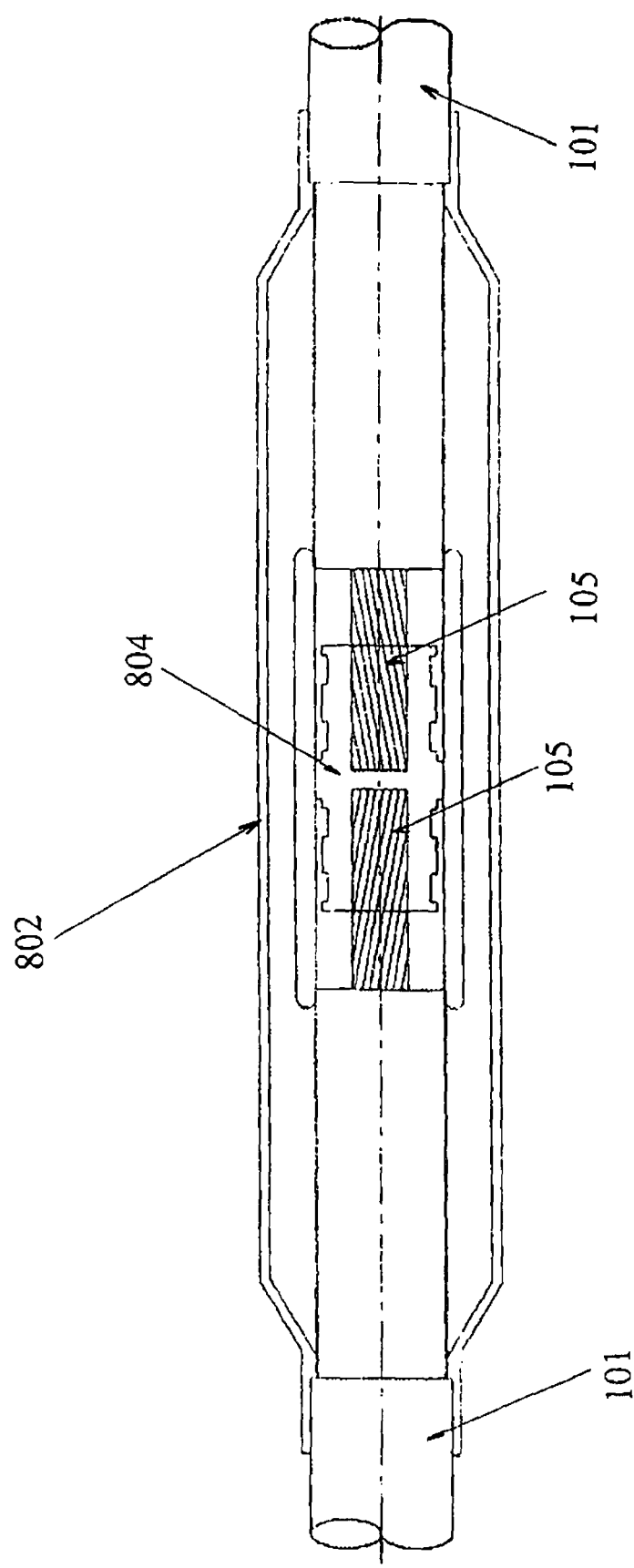
FIG. 8 depicts a conventional one-piece permanent splice with the adapter wedge or mandrel of the present invention removed after the cable is set within the cable splice.

Referring next to FIG. 8, depicted is a conventional one-piece permanent splice 802 with the mandrel of the present invention removed after the cable and outer cable jacket is set within the cable splice 802. Electrical connection means 804 are disposed within the cable splice 802 to ensure proper electrical conduction between two cable ends 105 of opposing cable members. In order to connect two opposing cable members and create a permanent splice, a cable adapter or a splice must be forced over each cable member. Therefore, the present invention provides a means and apparatus for allowing easy manipulation of the cable members while assuring a proper, tight-fitting mechanism for an effective splice.

Figure 9:
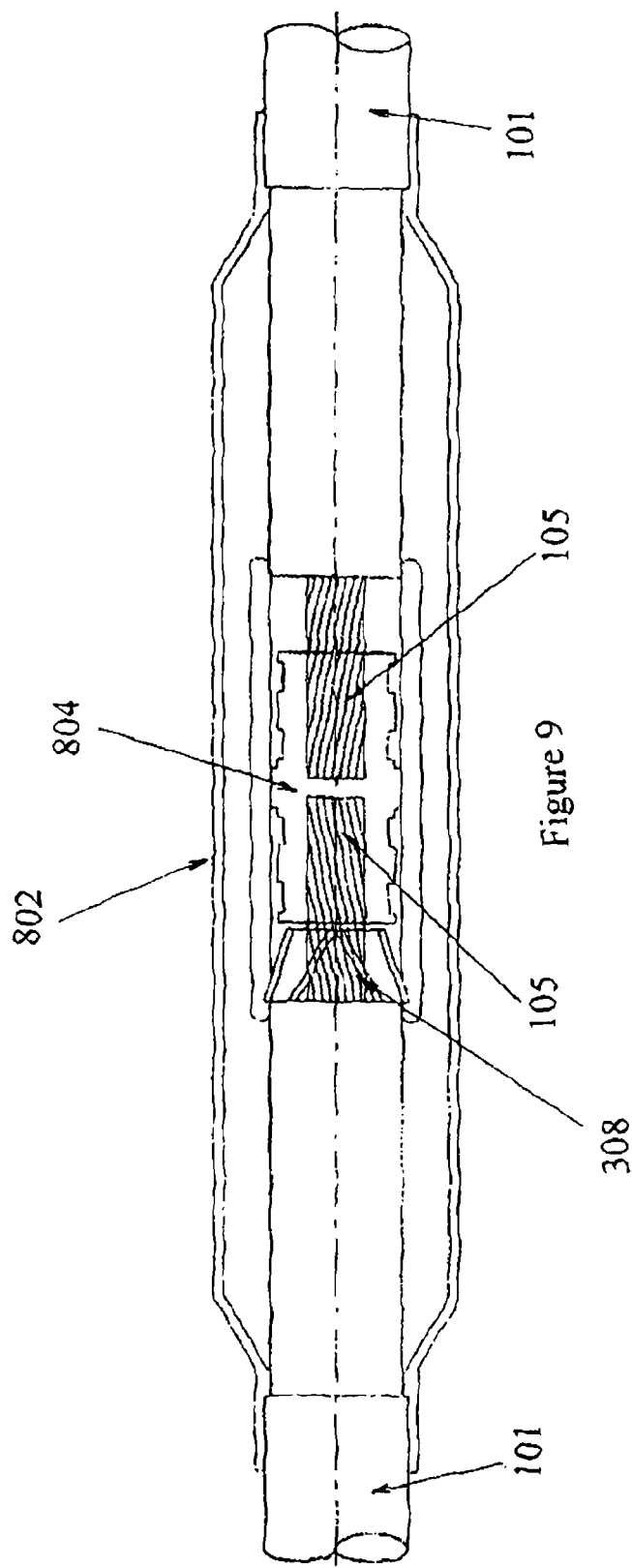
FIG. 9 depicts a conventional one-piece permanent splice with the adapter wedge or mandrel of the present invention remaining within the assembly after the cable is set within the cable splice.

Referring next to FIG. 9, depicted is a conventional one-piece permanent splice with the mandrel 308 of the present invention remaining within the assembly after the cable is set within the cable adapter. Electrical connection means 804 are disposed within the cable splice 802 to ensure proper electrical conduction between two cable ends 105 of opposing cable members. In order to connect two opposing cable members and create a permanent splice, a cable adapter or a splice must be forced over each cable member. Therefore, the present invention provides a means and apparatus for allowing easy manipulation of the cable members while assuring a proper, tight-fitting mechanism for an effective splice. In addition, the mandrel 308 may remain within the cable splice 802.

Figures 10, 10A:
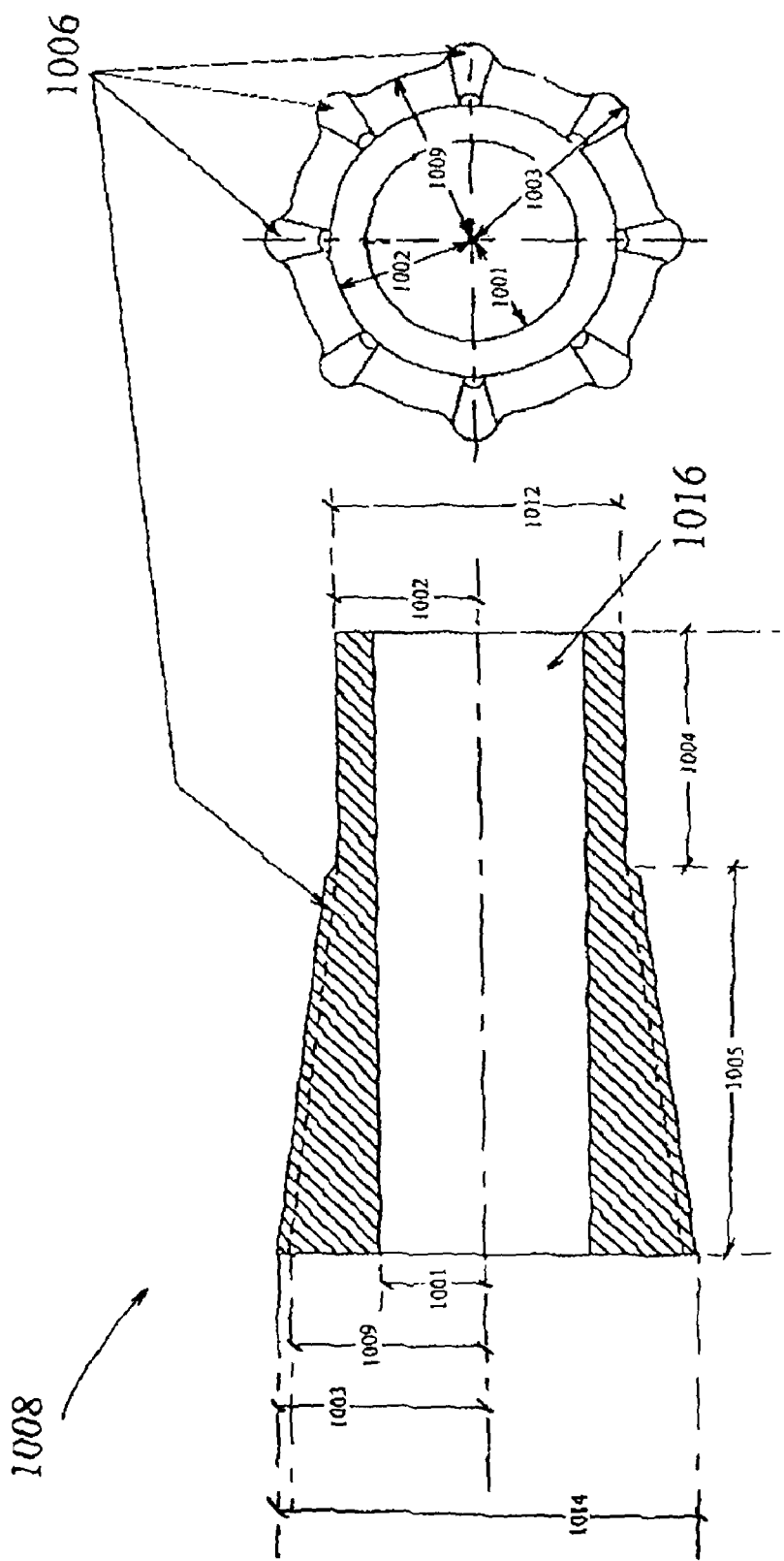
FIG. 10 depicts a side view of an alternate embodiment of the present invention comprising a uniquely tapered mandrel with an extended end and longitudinally positioned ribs.
FIG. 10A depicts a front view of an alternate embodiment of the present invention comprising a uniquely tapered mandrel with an extended end and longitudinally positioned ribs.

FIG. 10 depicts an alternate embodiment of the present invention comprising a uniquely tapered mandrel 1008. The uniquely tapered mandrel 1008 comprises a bore 1016 and a shell, wherein said shell comprises a first dimension at a first end 1012 and a second dimension at a second end 1014. The second dimension 1014 may be at least slightly larger than the first dimension 1012. The mandrel 1008 may further comprise an extended end 1004 having a front radius 1002 and taper 1005 with an end radius 1003. The extended end 1004 may prove effective in allowing for factory installation of the mandrel 1008 within the joint components. Taper 1005 further comprises a multitude of integral ribs 1006 which are distributed longitudinally along the length of the uniquely tapered mandrel 1008 perpendicular to the circumference of the mandrel 1008. The thickness of ribs 1006 is defined by the difference in radii 1003 and 1009. Although numerous thickness values may be utilized in the present invention depending on the degree of lubrication desired, the degree of force desired to stretch the splice components and the degree of stretch desired it has been determined that ribs with a thickness of 0.06 inches to 0.25 inches, beyond the substantial exterior portion of the mandrel, are most appropriate for use in the field of high voltage splicing. However, values greater than and less than the preferred thickness values may be utilized in the art depending on the types of materials used and the lubricants employed. In addition, mandrel 1008 may be manufactured of any material strong enough to support the inward hoop force imposed on it from a fully expanded cable adapter. However, in the present embodiment of the invention, it is preferred that the mandrel 1008 be manufactured of a polypropylene-type material, polyethylene-type material, polyvinyl chloride-type material, polyurethane type-material, epoxy-type material, or a nylon-type material; however, numerous other types of materials may be utilized in the present invention. Mandrel 1008 can be fabricated by machining or more preferably by molding. Furthermore, it is known in the art that present high-voltage components are primarily manufactured of two distinct materials, ethylene propylene diene monomers (EPDM) or silicones. Since EPDM's are hydrocarbon-based materials, it is preferred in the present invention that the lubricant utilized should comprise non-hydrocarbon (petroleum) based lubricants. Typically such lubricants are silicone-based materials such as dimethypolysiloxane. Furthermore, it is preferred in the present invention that for splicing materials manufactured of silicone-based components, lubricant may comprise any non-silicone based materials except those materials that would be deleterious to high-voltage cable systems.

In the present embodiment, radius 1001 should be constructed of sufficient size so that the prepared cable (as set forth in FIG. 1) can easily be inserted therein. For example, an adapter mandrel may be manufactured for connectors of a 600 Ampere classification wherein the diameters of the cable adapters in which mandrel 308 is to be inserted cover high-voltage diameter ranges of 0.500 to 2.120 inches. The most common diameters used for this type of connection are in a range of 0.980 to 1.780 inches. In another example, the present invention may be manufactured for a 200-Ampere classification premolded separable connectors, wherein diameters may range from 0.500 to 1.465 inches with a typical range of 0.640 to 0.950 inches. It is foreseeable that the present invention may be manufactured for other connectors of varying classifications, including, but not limited to 200 Ampere classification connectors, 600 Ampere classification connectors, 900 Ampere classification connectors or the like.

FIG. 10A depicts a front view of the uniquely tapered mandrel of the present invention. Inner radius 1001 and extended end radius 1002 are shown for reference. Furthermore, ribs 1006 are identified and positioned longitudinally along mandrel 1008. Additionally, the thickness of ribs 1006 is defined by the differences in radius 1003 and radius 1009.

While the present invention has been described with reference to one or more preferred embodiments, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

I claim:

1. A method of installing a recoverable electrical insulating device having a bore therein for placing a prepared electrical cable member therethrough comprising the steps of:
    (a) providing a mandrel means having a first end of a first diameter and a second end of a second diameter larger than said first diameter of said first end,
    comprising a tapered exterior surface between said first end and said second end and a bore therethrough from said first end to said second end,
    wherein exterior surface of said mandrel comprises ribs;
    (b) providing lubrication means for lubricating said exterior surface of said mandrel;
    (c) placing said bore of said mandrel onto said prepared electrical cable member;
    (d) forcing said recoverable electrical insulating device over said mandrel and said prepared electrical cable member thereby expanding at least a portion of said recoverable electrical insulating device to allow for lubrication to remain within the internal cavity of said recoverable electrical insulating device within the voids between the ribs of said mandrel; and
    (e) contraction means for providing a snug fit around said prepared electrical cable.

2. The method of claim 1, wherein the step of removing said mandrel from said prepared electrical cable is carried out by breaking said mandrel.

3. The method of claim 1, wherein said mandrel remains within said removable electrical insulating device.

* * * * *